United States Patent
Rhoads

(10) Patent No.: US 11,410,263 B1
(45) Date of Patent: Aug. 9, 2022

(54) METHODS AND ARRANGEMENTS FOR ENHANCED DIGITAL SIGNAL DETECTION

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 6 days.

(21) Appl. No.: 16/994,251

(22) Filed: Aug. 14, 2020

Related U.S. Application Data

(60) Provisional application No. 63/029,662, filed on May 25, 2020.

(51) Int. Cl.
*G06T 1/00* (2006.01)
*G06F 3/14* (2006.01)

(52) U.S. Cl.
CPC .............. *G06T 1/0092* (2013.01); *G06F 3/14* (2013.01); *G06T 1/0028* (2013.01); *G06T 2201/0051* (2013.01); *G06T 2201/0065* (2013.01)

(58) Field of Classification Search
CPC .............. G06T 1/0092; G06T 1/0028; G06T 2201/0051; G06T 2201/0065; G06F 3/14
See application file for complete search history.

(56) References Cited

U.S. PATENT DOCUMENTS

| 5,903,884 | A | 5/1999 | Lyon |
| 6,483,927 | B2 | 11/2002 | Brunk |
| 6,580,809 | B2 | 6/2003 | Stach |
| 6,724,914 | B2 | 4/2004 | Brundage |

(Continued)

OTHER PUBLICATIONS

Chen et al, Clusternet: Deep hierarchical cluster network with rigorously rotation-invariant representation for point cloud analysis, IEEE/CVF Conference on Computer Vision and Pattern Recognition 2019 (pp. 4994-5002).

(Continued)

*Primary Examiner* — Christopher Wait
(74) *Attorney, Agent, or Firm* — Digimarc Corporation

(57) ABSTRACT

A method for transforming an input array of pixel data into an output array of data, to yield enhanced expression of a digital watermark signal in the output array. One such method includes, for each pixel in the input array, generating a first datum that indicates a value difference between said pixel and a neighboring pixel in a first direction, the first data thereby collectively comprising a first directional difference array. Similarly, for each such pixel in the input array, generating a second datum that indicates a value difference between said pixel and a neighboring pixel in a second direction, the second data thereby collectively comprising a second directional difference array. One or more transforms to a spatial frequency domain are then performed, using these first and second directional difference arrays as input data. First and second results from the one or more transformations are then combined to yield an output array. The just detailed process causes the digital watermark signal in the output array to exhibit a greater signal-to-noise ratio than in the digital watermark signal in the input array. A great number of other features and arrangements are also detailed.

20 Claims, 2 Drawing Sheets

(56) References Cited

U.S. PATENT DOCUMENTS

| | | | |
|---|---|---|---|
| 7,231,061 | B2 | 6/2007 | Bradley |
| 10,007,863 | B1* | 6/2018 | Pereira .................. G06T 7/60 |
| 10,664,722 | B1 | 5/2020 | Sharma |
| 2010/0165158 | A1 | 7/2010 | Rhoads |
| 2010/0325117 | A1 | 12/2010 | Sharma |
| 2013/0308045 | A1 | 11/2013 | Rhoads |
| 2014/0029809 | A1 | 1/2014 | Rhoads |
| 2014/0108309 | A1 | 4/2014 | Frank |
| 2015/0055837 | A1 | 2/2015 | Rhoads |
| 2015/0055855 | A1 | 2/2015 | Rodriguez |
| 2015/0161482 | A1 | 6/2015 | Preetham |
| 2015/0170001 | A1 | 6/2015 | Rabinovich |
| 2015/0242707 | A1 | 8/2015 | Wilf |
| 2015/0278224 | A1 | 10/2015 | Jaber |
| 2016/0140425 | A1 | 5/2016 | Kulkarni |
| 2016/0189381 | A1 | 6/2016 | Rhoads |
| 2016/0267358 | A1 | 9/2016 | Shoaib |
| 2016/0379091 | A1 | 12/2016 | Lin |
| 2017/0004597 | A1 | 1/2017 | Boles |
| 2017/0294010 | A1 | 10/2017 | Shen |
| 2017/0316281 | A1 | 11/2017 | Criminisi |
| 2018/0005343 | A1 | 1/2018 | Rhoads |
| 2018/0032844 | A1 | 2/2018 | Yao |
| 2018/0165548 | A1 | 6/2018 | Wang |
| 2018/0182116 | A1 | 6/2018 | Rhoads |
| 2019/0057314 | A1 | 2/2019 | Julian |
| 2019/0266749 | A1 | 8/2019 | Rhoads |
| 2019/0332840 | A1 | 10/2019 | Sharma |

OTHER PUBLICATIONS

Cheng et al, Rifd-CNN: Rotation-invariant and fisher discriminative convolutional neural networks for object detection, IEEE Conference on Computer Vision and Pattern Recognition 2016 (pp. 2884-2893).

Chidester, et al, Rotation equivariance and invariance in convolutional neural networks, arXiv preprint arXiv:1805.12301, May 31, 2018.

Deng, et al, Joint hand detection and rotation estimation using CNN, IEEE Transactions on Image Processing, Dec. 4, 2017;27(4):1888-900.

Esteves, et al, Polar transformer networks, arXiv preprint arXiv:1709.01889, Sep. 6, 2017.

Follmann, et al, A rotationally-invariant convolution module by feature map back-rotation, 2018 IEEE Winter Conference on Applications of Computer Vision (WACV) Mar. 1, 20182 (pp. 784-792), IEEE.

Jaderberg et al, Spatial transformer networks, arXiv preprint arXiv:1506.02025, Jun. 5, 2015.

Ma et al, Arbitrary-oriented scene text detection via rotation proposals, IEEE Transactions on Multimedia, Mar. 23, 2018;20(11):3111-22.

Marcos et al, Rotation equivariant vector field networks, IEEE International Conference on Computer Vision 2017 (pp. 5048-5057).

Shi et al, Real-time rotation-invariant face detection with progressive calibration networks, IEEE Conference on Computer Vision and Pattern Recognition 2018 (pp. 2295-2303).

Weiler et al, Learning steerable filters for rotation equivariant CNNs, IEEE Conference on Computer Vision and Pattern Recognition 2018 (pp. 849-858).

Zhang X, Liu L, Xie Y, Chen J, Wu L, Pietikainen M, Rotation invariant local binary convolution neural networks, IEEE International Conference on Computer Vision Workshops 2017 (pp. 1210-1219).

Krizhevsky, et al, Imagenet classification with deep convolutional neural networks, Advances in Neural Information Processing Systems, pp. 1097-1105, 2012.

Babenko, et al, Neural Codes for Image Retrieval, arXiv preprint, arXiv:1404.1777 (2014), 16 pages.

LeCun et al, Handwritten Digit Recognition with a Back-Propagation Network, Advances in Neural Information Processing Systems, pp. 396-404, 1990.

Szegedy, et al, Going Deeper with Convolutions. IEEE Conference on Computer Vision and Pattern Recognition, pp. 1-9, 2015.

Szegedy, et al, Intriguing Properties of Neural Networks, arXiv preprint, arXiv:1312.6199v4, 2014, 10 pages.

Zeiler et al, Visualizing and Understanding Convolutional Networks, European Conference on Computer Vision, 2014, 16 pages.

Chapelle, et al, Model selection for support vector machines, Advances in neural information processing systems. 1999;12:230-6.

Coli, et al, The toroidal neural networks, 2000 IEEE International Symposium on Circuits and Systems (ISCAS) May 28, 2000 (vol. 4, pp. 137-140).

Mikulski, et al, Toroidal AutoEncoder, arXiv preprint arXiv:1903.12286. Mar. 28, 2019.

Palazzari, et al, Massively parallel processing implementation of the toroidal neural networks, Proceedings of the 2000 6th IEEE International Workshop on Cellular Neural Networks and their Applications, May 25, 2000 (pp. 295-300).

Tang, et al, Diagonal and toroidal mesh networks, IEEE Transactions on Computers. Jul. 1994;43(7):815-26.

\* cited by examiner

IF CENTER >= NEIGHBOR, +1
IF CENTER < NEIGHBOR, -1
OCT-AXIS = -1 + -1 + -1 + -1 + -1 + 1 + 1 + 1 = -2

IF CENTER >= NEIGHBOR, +1
IF CENTER < NEIGHBOR, -1
OCT-AXIS = -1 + -1 + -1 + -1 + 1 + 1 + 1 + 1 = 0

METHODS AND ARRANGEMENTS FOR ENHANCED DIGITAL SIGNAL DETECTION

RELATED APPLICATION DATA

This application claims priority benefit to provisional application 63/029,662, filed May 25, 2020, the disclosure of which is incorporated herein by reference.

INTRODUCTION

Various image processing tasks require precise knowledge about the spatial pose of an object depicted in imagery. For example, when a supermarket scanner captures an image of a box of cereal, decoding watermarked data (e.g., a UPC code of a GTIN number) from the artwork requires knowledge of the precise pose with which the artwork is depicted in the captured image frame. With such pose information (e.g., rotation, scale, x-translation and y-translation), the captured imagery can be resampled to yield image data from which the watermark data can be decoded.

A watermark signal commonly includes two components: a payload signal component and a reference signal component. The reference signal component is designed to be detectable irrespective of pose. Once found, the geometrical distortion of the reference signal indicates the geometric distortion of the companion payload signal, revealing the pose information needed for payload decoding.

A common reference signal is a collection of a dozen or more 2D sinusoids, of known frequencies and phases. Collectively the sinusoids form a noise-like weave pattern that can be included at low amplitude in the watermark signal—too weak to detract from human perception of the cereal box artwork, yet strong enough to enable computer detection and characterization.

In recovering the reference signal from captured imagery, and in decoding the watermark, the artwork itself (which is sometimes termed "host artwork," since it is host to the watermark signal) serves as noise—a signal that interferes with detection of the watermark signal components. Desirably a filter is applied to the captured imagery to diminish this interfering effect of the artwork. For about 20 years applicant has employed a so-called "oct-axis" filter for this purpose.

In oct-axis filtering, each pixel in the captured image is assigned a new value based on some function of the original pixel's value, relative to its neighbors. An exemplary embodiment considers the values of neighbors in eight directions—the pixels to the north, northeast, east, southeast, south, southwest, west and northwest of a central pixel. If the central pixel has a value greater than or equal to a neighbor, a "1" is added to the oct-axis value; if the central pixel has a value lower than a neighbor, a "4" is added to the oct-axis value. That is, the sign of the difference between values of the subject pixel and the neighbor determines the summed component: a positive difference yields a +1 component, and a negative difference yields a −1 component. Such process continues across all eight neighbors, yielding a resultant sum of these eight components in the set {−8, −6, −4, −2, 0, 2, 4, 6 8}. This resulting scalar value is the "oct-axis" value for this central pixel.

All pixels in the captured imagery are typically processed in this manner. Such transformation of the image greatly diminishes the interfering effect of the human-perceptible host artwork, without similarly diminishing the reference and payload signals of the watermark. The signal to noise ratio of the watermark signal, relative to the host artwork, is thus enhanced.

As digital watermarks gain popularity, their use is spreading to increasingly demanding applications. One is in sorting plastics for recycling. Watermarks on plastic bottles and their labels allow each bottle to be recognized by its plastic type (e.g., polyethylene terephthalate, high-density polyethylene). Reading watermarks from trash in waste streams, however, is challenging, due to adverse conditions such as soiling and crumpling.

It would be beneficial to have an improved filtering technology that further increases the signal-to-noise ratio of digital watermark signals, to permit their reading under increasingly adverse conditions.

The foregoing and other features and advantages of the present technology will be more readily apparent from the following detailed description, which proceeds with reference to the accompanying drawings.

DETAILED DESCRIPTION

Figure 1:
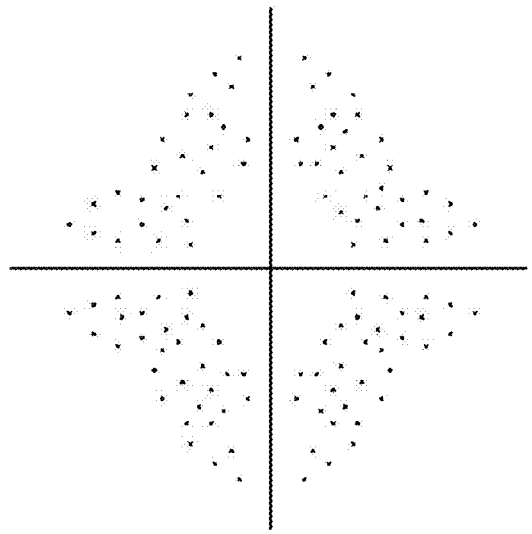
FIG. 1 shows an exemplary digital watermark reference signal, plotted in a spatial frequency domain representation.

Once a captured image signal has been oct-axis processed, the resulting oct-axis signal is typically transformed to the spatial frequency domain by a domain transformation operation such as an FFT. In the resulting spatial frequency data, the 2D sinusoids comprising the reference signal appear as peaks. Collectively they form a distinctive constellation, as shown by the spatial frequency plot of FIG. 1. (Each dot in the plot represents the spatial frequency of one 2D sinusoid in the reference signal. The payload signal and the remaining vestiges of the host artwork signal are omitted from the FIG. 1 depiction, as they spread across the plot and are not amenable to simple black and white illustration. The FIG. 1 plot is sometimes termed a u,v plot, with u and v denoting the two coordinate axes.)

If a camera is moved away from a watermarked cereal box (or plastic bottle), the depiction of the cereal box in the captured imagery grows smaller, and the scale of the watermark similarly diminishes. This causes the peaks of FIG. 1 to spread radially outward, because the sinusoidal variations of the reference signal are occurring in a smaller space, thereby increasing their spatial frequency. And inversely, if the camera is moved towards the cereal box, the scale increases, and the spatial frequencies decrease. If the camera is rotated relative to the cereal box, the constellation of peaks similarly rotates. If the camera is moved laterally side to side (or up and down) relative to the cereal box, the phases of the depicted peaks change. Yet through all such pose variations, the basic form of the constellation remains, enabling a suitable reference signal detector to locate the reference signal and discern from it the scale,rotation, and translation of the watermark's payload signal.

(Different types of watermark reference signal detectors can be used to locate the reference signal and discern its pose parameters, including detectors based on impulse matched filter and direct least squares arrangements. Such arrangements are detailed in U.S. Pat. Nos. 6,590,996, 9,959,587 and 10,242,434.)

Figure 2:
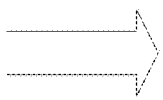
FIG. 2 illustrates how an oct-axis value for an image pixel can be computed.

In judging the signal-to-noise ratio of a watermark reference signal, one useful metric is Linear Reference Pattern Strength, or LRPS. (This and other watermark signal metrics are detailed in U.S. Pat. No. 10,506,128.) In the spatial frequency plot of FIG. 1, the magnitude of each signal peak in the reference signal constellation, is divided by the average value of its 4 or 8 immediate neighbors (i.e., the spatial frequency magnitudes at spatial frequency coordinates one unit to the sides, up, down, and possibly diagonally, from the peak location). Such ratios, computed for all peaks in the constellation, are then averaged to yield the LRPS value. The greater this LRPS value, the more distinctly the watermark signal stands out from the noise. (Another variation of such metric is based on the ratio between each peak's magnitude, and the magnitude of the next-strongest peak within a certain surrounding neighborhood, such as of 5×5 or 9×9 locations around the peak in the spatial frequency space.) Back to oct-axis, FIG. 2 gives a real-world example. On the left is an excerpt from camera-captured imagery, showing 8-bit values for different pixels in the image. On the right are shown the eight +1 or −1 components of the oct-axis value for the pixel that is outlined in bold.

We start by comparison with the pixel to the north of the subject pixel (north of the bolded pixel). The subject pixel is lower in value than the pixel to its north (79<82), so the first component is −1. The subject pixel is also lower in value than the pixel to the northeast (79<85), so another −1 is added to the oct-axis sum. Similarly with the other six pixels that are edge-adjoining or corner-adjoining to the subject pixel, yielding a final oct-axis value (sum) of −2.

The same procedure is performed for all pixels in the image, yielding a transformed 2D array whose values are between −8 and +8. This is the array that results after oct-axis filtering. As described above, watermark detection next typically involves application of an FFT to transform this array to the spatial frequency domain, from which the distinctive constellation of the reference signal is found.

In connection with doing something else, the present inventor did not sum the eight pixel difference results used to form an oct-axis result, but maintained the differences in an 8-element ordered vector for each pixel. For the bolded pixel in FIG. 2, this ordered vector was {−1, −1, −1, −1, −1, 1, 1, 1}. Such a vector was compiled for each pixel in the image. From these vectors, eight different 2D arrays were generated. The first comprised just the first element from each vector, i.e., the north difference for each pixel in the imagery (or excerpt thereof). This array can be termed the north difference array. The second comprised just the second element from each vector, i.e., the northeast difference. This array can be termed the northeast difference array. And so forth for the following six positions in the vectors. (Such arrays are generically termed directional difference arrays.)

Eight FFTs were then performed. Input data for the first FFT was the north difference array. Input data for the second FFT was the northeast difference array. And so forth for the third through eighth FFTs.

These eight FFTs produced eight spatial frequency domain representations of the directional difference arrays. Since an FFT is a linear transform, the inventor expected that summing the results of these eight FFTs, which were each applied to a single directional difference array, would yield the same result as the prior art oct-axis method of summing the eight differences for each pixel, and then applying a single FFT to the result.

Surprisingly, not so.

Also surprising was that the sum of the eight FFTs yielded a spatial domain representation of the watermark signal that exhibited a 10+% better signal-to-noise ratio than the prior art. That is, the LRPS metric for the reference signal, as represented in the summed results of the eight FFTs, was about 10+% better than the LRPS metric for the reference signal when represented in the output from a single FFT based on summed differences (i.e., the original oct-axis method). This was surprising because previous efforts to increase the LRPS signal-to-noise ratio had not yielded improvements of such magnitude.

After much puzzling, the inventor now believes the lack of linearity is due to a lack of spatial co-location of the differences. The difference between the subject pixel and its northern neighbor expresses a signal gradient in that northerly direction for a point halfway between the two pixels, i.e., a half-pixel north of the subject pixel. Similarly, the difference between the subject pixel and its northeastern neighbor expresses a signal gradient in that diagonal direction for a point halfway between the subject pixel and its diagonal neighbor, i.e., 0.707 pixels to the northeast of the subject pixel. Likewise for the other differences. The eight differences in each vector thus express gradients associated with eight different locations that are spaced away from the subject pixel, and are not at the subject pixel itself. Since each difference relates to a different spatial location, linearity does not apply.

Figure 3:
FIG. 3 shows computation of another oct-axis value, in different imagery than FIG. 2.

After much further puzzling, the inventor believes the improved performance is due to inadvertent loss of information in the prior art oct-axis method. FIG. 3 helps illustrate. In this situation the subject pixel has a value of 79, three of the neighboring pixels have slightly larger values (80) and three have slightly smaller values (78). But the east pixel has a value of 105 and the west pixel has a value of 55. This strong gradient to the east may be consistent with the watermark signal, and this strong gradient to the west may be consistent with the watermark signal, but by summing the corresponding −1 and +1 data indicating these gradients, such information is lost.

That is, a gradient that extends through the subject pixel, yielding a −1 datum in one direction, and a +1 datum in an opposite direction, always cancel each other, and no evidence of such gradient remains. By considering each of the eight gradients separately, and summing eight image-wide FFTs based on such gradients, such information is preserved. (The cited example is but one of many in which such useful information can be lost.)

Applicant terms the revised method OctVector, in contrast to the prior art oct-axis method, which is hereafter termed "OctScalar" to avoid confusion.

FFTs are somewhat computationally expensive. The inventor found that the information in the south difference array is largely cumulative of the information in the north difference array. (Each is simply the negative of the other, shifted by one pixel.) Likewise for other opposed directions: northeast-southwest, etc. So in one particular embodiment, four FFTs are performed rather than eight: one based on the north difference array, one based on the northeast difference array, one based on the east difference array, and one based on the southeast difference array.

Figure 4:
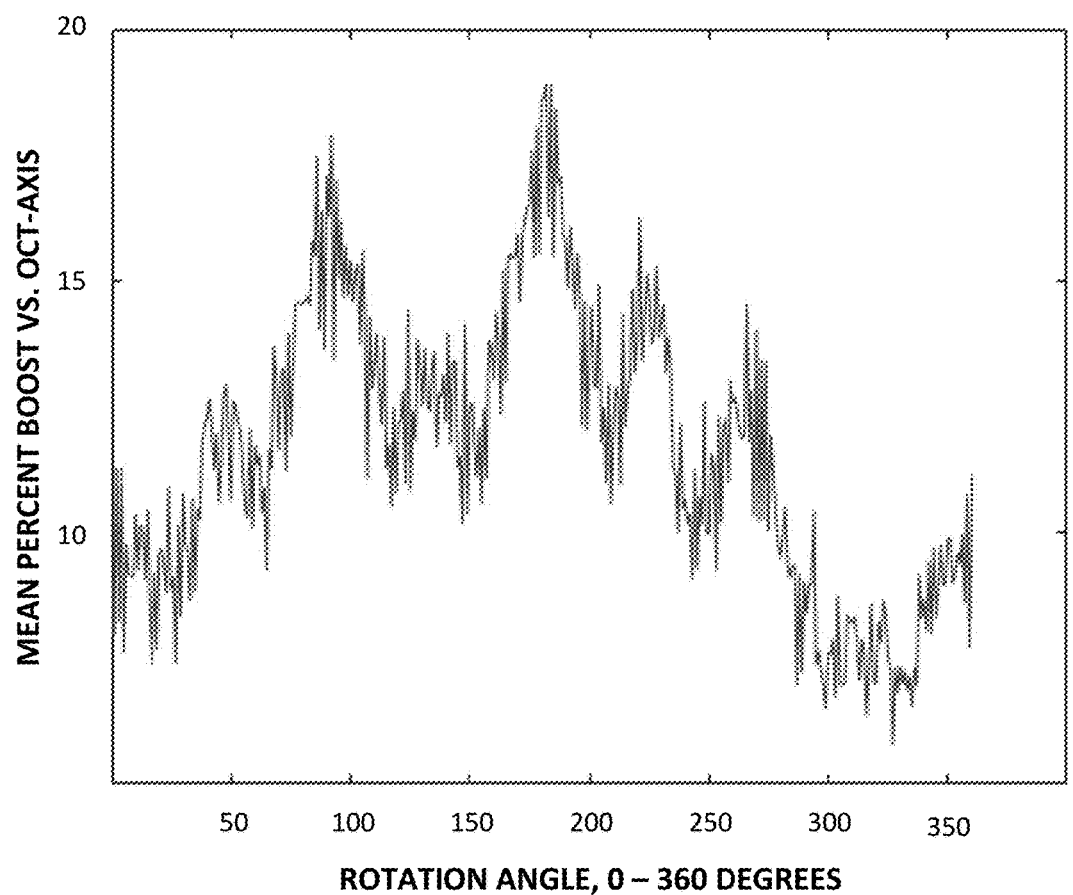
FIG. 4 is a plot showing improvement in a Linear Reference Pattern Strength metric produced by one particular embodiment of the present technology.

FIG. 4 shows the improvement in signal-to-noise metric that results from the four-summed-FFT approach, as compared to the single FFT based on eight summed differences, as done in the prior art OctScalar approach. A 16-sunusoid reference signal without payload signal was embedded in a host image. The host image was rotated to each of 360 different orientations in one degree steps. At each step the embedded image was translated by a random amount in x- and y-directions, fifty different times, and for each such pose an LRPS metric was computed. These fifty values were averaged for each of the 360 rotation steps. FIG. 4 plots the resulting 360 figures resulting from such analysis, as a percent improvement over the prior art OctScalar approach. (The structure of the FIG. 4 curve is believed due to structure in the host image.) The better signal-to-noise ratio can be expressed mathematically as follows:

$$\underbrace{\frac{\sum_{i=1}^{4}|FFT(Diff_i)|_{REF.}}{\sum_{i=1}^{4}|FFT(Diff_i)|_{NOISE}}}_{VECTOR} > \underbrace{\frac{\left|FFT\left(\sum_{i=1}^{8}Diff_i\right)\right|_{REF.}}{\left|FFT\left(\sum_{i=1}^{8}Diff_i\right)\right|_{NOISE}}}_{SCALAR}$$

While four summed FFTs are presently preferred, other embodiments can employ still less—such as two or three. A two FFT approach can perform an FFT on an array of north differences, and on an array of northeast differences, and sum those two results. Or any other pair of directions can be used (although opposing directions are disfavored). Similarly, a three FFT approach can perform FFTs on three different arrays of differences (again preferably avoiding including of two opposing directions.)

The prior art OctScalar approach performs a single FFT operation on an array of values that can have nine different states (−8, −6, . . . , 8). The OctVector approach performs, e.g., four FFTs, but they are on arrays of values that can have only two different states: −1 or +1. This reduction in complexity permits some simplifications in implementing the FFT using dedicated hardware, such as an ASIC, since multiplies by the difference values are simply identity functions or negate functions.

A further simplification can arise from packing the four arrays of −1/+1 difference values into a single, larger, FFT. For example, if the image is 128×128 in size, a 256×256 FFT can be performed, on a 128×128 tiled array of 2×2 cells. In the top left corner of each cell is, e.g., a north difference value; in the top right corner of each cell is, e.g., a northeast difference value; in the bottom left corner of each cell is an east difference value; and in the bottom right corner of each cell is a southeast difference value. The 128×128 array of north difference values is thus scattered through the 256×256 array, occupying the top left corner positions in each of the 128×128 tiled cells, and likewise for each of the other three arrays of difference values.

When an FFT is performed on such a packed array of cells, the output is a 256×256 array of spatial frequency data, with aliasing. This is addressed by segmenting (dividing) the resulting 2D plot into four quadrants (i.e., along the u and v coordinate axes, yielding upper left, upper right, lower left, and lower right quadrants), and summing the four quadrants together, yielding a 128×128 array (in which the peaks comprising the reference signal are prominent).

Such an arrangement may be termed a packed binary sheet approach, in which binary values from two or more directional difference arrays are grouped together in cells, which are assembled in a tiled array. An FFT is applied to the tiled array, and the four quadrants of the resulting spatial frequency domain data are then combined.

(In some embodiments, the magnitude values in each quadrant are squared before summing, i.e., the results are summed in quadrature. In some embodiments, the oct-vector values packed into the sheet are differently weighted depending on direction, e.g., the N and E, or cardinal directions, may be weighted by 1, and the NE and SE, or diagonal directions, may be weighted by 0.707. Such values are empirically determined based on trials with test cases.)

The just-described packed binary sheet arrangement runs nearly twice as fast as the earlier-described four FFT approach. (The packed binary sheet arrangement takes a bit more than twice the time of the prior art OctScalar approach.)

The improved performance of both the packed binary sheet arrangement and the multiple FFT arrangement improves still further as the number of 2D sinusoids in the reference signal increases beyond 16.

It will be recognized that two types of OctVector filtering have been illustrated by particular examples. The first type involves defining multiple N×N arrays of directional differences, performing an FFT on each, and summing the results. The second type involves again defining multiple N×N arrays of directional differences, but this time packing them into an M×M array, where M>N, performing a single FFT on the packed array, and then segmenting and summing the results.

A further variety of OctVector filtering uses a quaternion FFT approach. In one such embodiment, two complex FFTs are computed. The north difference array is input for the real values of the first FFT, and northeast difference array is input for the imaginary values of the first FFT. Similarly, the east difference array is input as the real plane of the second FFT, and the southeast difference array is input as the imaginary plane of the second FFT. After performing the complex FFTs, Fourier magnitudes are computed from both halves of the first FFT, and likewise for both halves of the second FFT. The two resulting sets of Fourier magnitudes are then combined (e.g., by summing, or summing squared values) to yield the final spatial frequency domain output array.

In all of the detailed arrangements, the output array of spatial frequency data is typically provided to a watermark detector (e.g., per the earlier-identified patents), which outputs rotation, scale and translation parameters that characterize the pose of the watermarked object as depicted in the input imagery. The input image is then usually re-sampled (interpolated) to yield samples at each of the payload encoding locations (e.g., a 128×128 array of waxel locations in a 150 waxels-per-inch block).

From the resampled input image the known reference signal may be subtracted, since it has served its purpose (e.g., of signaling the presence of the watermark and revealing pose information) and now may be regarded as a known noise source. The re-sampled image data is then OctScalar processed, to again attenuate the host artwork (noise), and the resulting 128×128 data samples are then processed to decode the watermark payload.

Once the watermark payload is extracted, an action can be taken based on the extracted information. For example, a plastic bottle may be diverted from a waste stream into a bin that collects bottles known to be formed of polyethylene terephthalate. Or a consumer item identified by the payload information at a retail point of sale station may be added to a shopper's tally, a price look-up executed, and the shopper billed accordingly.

CONCLUDING REMARKS

Having described and illustrated certain arrangements that exemplify aspects of applicant's technology, it should be understood that the technology is not so-limited.

For example, there are many variants of oct-axis that can be adapted for OctVector use according to the present technology. One is a ternary arrangement, in which the elements of an eight (or four) element vector can have values of −1, 0 or +1 (instead of −1 or +1 as in the earlier examples). The '0' state is used when the value of a neighboring pixel matches, i.e., is equal to, that of the subject pixel.

In a further variant, the '0' state is not only used when the value of a neighboring pixel matches that of the subject pixel, but is also used when the neighboring pixel and the subject pixel values are close in value. "Close" can be established in accordance with empiricism or requirements of a particular application, but is typically expressed as within a threshold value difference, such as 1 to 10, or 20, in an eight bit pixel system. Such range of "close" can be symmetrically centered about the subject pixel value (e.g., if a subject pixel has a value of 78, "0" elements are assigned to neighbors having values between 73 and 83). Alternatively, the range can be asymmetrical—extending below and above the subject pixel values by different amounts (e.g., if the subject pixel has a value of 78, "0" elements are assigned to neighbors having values between 75 and 95).

Many other variants of oct-axis are detailed in the incorporated-by-reference documents, and such arrangements can be straightforwardly extended to the OctVector arrangements detailed herein.

In still other embodiments, arrangements other than binary and ternary can be employed, e.g., with elements of the vectors being chosen from four or more possibilities. In one further example, the vector elements comprise the difference values themselves, e.g., ranging from −255 to 255.

Although the detailed arrangements contemplate picture elements organized in rows and columns, this not essential. In one such variant, hexagonally-arranged picture elements are used. In such case each element has six neighbors (three of which are opposing and thus largely redundant, and may be ignored).

Familiar image processing libraries such as OpenCV can be employed to perform many of the methods detailed in this specification. Software instructions for implementing the detailed functionality can also be authored by the artisan in C, C++, MatLab, Visual Basic, Java, Python, Tcl, Perl, Scheme, Ruby, etc., based on the descriptions provided herein.

Software and hardware configuration data/instructions are commonly stored as instructions in one or more data structures conveyed by tangible media, such as magnetic or optical discs, memory cards, ROM, etc., which may be accessed across a network.

This specification has discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Applicant's earlier work in related fields is detailed in patent publications 20160189381, 20170024840, 20180005343, 20190266749, 20190306385, 20190332840, and 20200234394; in pending international application PCT/US20/22801, filed Mar. 13, 2020; and in pending U.S. application 63/011,195, filed Apr. 16, 2020, Ser. No. 16/944,136, filed Jul. 30, 2020, and Ser. No. 16/849,288, filed Apr. 15, 2020.

Also relevant are the patent documents cited in the priority application 63/029,662, namely U.S. Pat. Nos. 9,514,389, 9,521,291, 9,544,516, 9,819,950, 9,911,069, 10,460,211, 10,460,413, 10,467,493, 10,488,912, 10,521,718, and 10,664,722, and patent applications 62/371,601, filed Aug. 5, 2016, 62/404,721, filed Oct. 5, 2016, 62/414,368, filed Oct. 28, 2016, 62/418,047, filed Nov. 4, 2016, 62/426,148, filed Nov. 23, 2016, and Ser. No. 16/849,288, filed Apr. 15, 2020.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method for transforming an input array of pixel data into an output array of data, both of said arrays including a digital watermark signal, said transforming enhancing a signal-to-noise ratio of the digital watermark signal in the output array relative to the input pixel array, the method comprising the acts:

for each pixel in said input array, generating a first datum, said first datum indicating a value difference between said pixel and a neighboring pixel in a first direction, said first data thereby collectively comprising a first directional difference array;

for each pixel in said array of pixel data, generating a second datum, said secondary datum indicating a value difference between said pixel and a neighboring pixel in a second direction different than the first direction, said second data thereby collectively comprising a second directional difference array;

performing one or more transformations to a spatial frequency domain, using said first and second directional difference arrays as input data;

combining first and second results produced from said one or more transformations, to yield an output array, wherein the aforesaid acts cause the digital watermark signal in the output array to exhibit a greater signal-to-noise ratio than in the digital watermark signal in said input array.

2. The method of claim 1 that includes:
decoding a payload component from said digital watermark signal; and
sorting an item of plastic based on said decoded payload component.

3. The method of claim 1 that includes:
decoding a payload component from said digital watermark signal; and
adding an item to a shopper's checkout tally based on said decoded payload component.

4. The method of claim 1 that includes:
discerning a pose of a digitally-watermarked object within said input array of pixel data, based on the output array; and
resampling the input array of pixel data based on said discerned pose.

5. The method of claim 1 that includes:
performing a first domain transformation on the first directional difference array, yielding a first set of spatial frequency domain data;
performing a second domain transformation on the second directional difference array, yielding a second set of spatial frequency domain data; and
summing said first and second sets of spatial frequency domain data, to yield said output array.

6. The method of claim 1 that includes:
packing the first and second directional difference arrays into a larger array;
performing a domain transformation on the larger array, yielding a set of spatial frequency domain data;
segmenting the spatial frequency domain data into plural parts, along straight boundaries defined by spatial frequency coordinates; and
summing said plural parts to yield said output array.

7. A method of processing imagery comprising plural pixels, the method comprising the acts:
for each pixel in a region of adjoining pixels, generating an N-element vector indicating relationships between a value of said pixel and values of N neighboring pixels, thereby yielding plural N-element vectors, where N is an integer greater than 1;
assembling first elements of said vectors into a first 2D array;
assembling second elements of said vectors into a second 2D array;
combining the first and second 2D arrays into a composite array;
transforming said composite array into a spatial frequency domain representation; and
detecting a digital watermark reference signal from said spatial frequency domain representation.

8. The method of claim 7 that includes segmenting said spatial frequency domain representation into parts, and combining said parts to yield a combined spatial frequency domain representation, wherein said detecting is performed on said combined spatial frequency domain representation.

9. A method of processing imagery comprising plural pixels, the method comprising the acts:
for each pixel in a region of adjoining pixels, generating an N-element vector indicating relationships between a value of said pixel and values of N neighboring pixels, thereby yielding plural N-element vectors, where N is an integer greater than 1;
assembling first elements of said vectors into a first 2D array;
assembling second elements of said vectors into a second 2D array;
transforming the first 2D array into a first spatial frequency domain representation;
transforming the second 2D array into a second spatial frequency domain representation;
combining said first and second spatial frequency domain representations into a composite spatial frequency domain representation; and
detecting a digital watermark reference signal from said composite spatial frequency domain representation.

10. The method of claim 1 that includes the acts:
for each pixel in said array of pixel data, generating a third datum, said third datum indicating a value difference between said pixel and a neighboring pixel in a third direction different than the first and second directions, the third data thereby collectively comprising a third directional difference array;
performing one or more transformations to a spatial frequency domain, using said first, second and third directional difference arrays as input data;
combining first, second and third results produced from said one or more transformations, to yield an output array, wherein the aforesaid acts cause the digital watermark signal in the output array to exhibit a greater signal-to-noise ratio than in the digital watermark signal in said input array.

11. The method of claim 10 that includes the acts:
performing a first domain transformation on the first directional difference array, yielding a first set of spatial frequency domain data;
performing a second domain transformation on the second directional difference array, yielding a second set of spatial frequency domain data;
performing a third domain transformation on the third directional difference array, yielding a third set of spatial frequency domain data; and
summing said first, second and third sets of spatial frequency domain data, to yield said output array.

12. The method of claim 10 that includes packing said first, second and third directional difference arrays into the larger array.

13. The method of claim 10 that includes the acts:
for each pixel in said array of pixel data, generating a fourth datum, said fourth datum indicating a value difference between said pixel and a neighboring pixel in a fourth direction different than the first, second and third directions, the fourth data thereby collectively comprising a fourth directional difference array;
performing one or more transformations to a spatial frequency domain, using said first, second, third and fourth directional difference arrays as input data; and
combining first, second, third and fourth results produced from said one or more transformations, to yield an output array, wherein the aforesaid acts cause the digital watermark signal in the output array to exhibit a greater signal-to-noise ratio than in the digital watermark signal in said input array.

14. The method of claim 13 that includes the acts:
performing a first domain transformation on the first directional difference array, yielding a first set of spatial frequency domain data;
performing a second domain transformation on the second directional difference array, yielding a second set of spatial frequency domain data;

performing a third domain transformation on the third directional difference array, yielding a third set of spatial frequency domain data;

performing a fourth domain transformation on the fourth directional difference array, yielding a fourth set of spatial frequency domain data; and summing said first, second, third and fourth sets of spatial frequency domain data, to yield said output array.

15. The method of claim 13 that includes packing said first, second, third and fourth directional difference arrays into the larger array.

16. A noise reducing filter method for imagery, the imagery comprising plural pixels in a region of adjoining pixels, each pixel having a value, the filter method comprising the acts:

(a) characterizing each of said pixels by a plural-element vector that indicates respective value relationships between a value of said pixel and values of each of plural neighboring pixels, thereby yielding a plural-element vector for each pixel in said region;

(b) assembling first elements of said plural-element vectors into a first 2D array;

(c) assembling second elements of said plural-element vectors into a second 2D array;

(d) performing one or more transformations to a spatial frequency domain, using said first and second arrays as input data; and (e) combining first and second results corresponding to said one or more transformations to yield an output array;

wherein characterizing each pixel in said region in plural ways, based on value relationships with each of plural neighboring pixels, followed by said acts (b), (c), (d) and (e), yields a spatial frequency domain representation of the imagery in which an interfering signal component is diminished.

17. The method of claim 16 wherein said imagery depicts a physical object bearing a digital watermark conveying a payload signal component and a reference signal component, and the method includes the acts:

processing said output array to obtain the payload signal component; and sorting said object, or identifying and adding said object to a shopper's checkout tally, based on said payload signal component.

18. The method of claim 16 wherein said imagery depicts a physical object bearing a digital watermark conveying a payload signal component and a reference signal component, and the method includes the act:

discerning a pose with which said physical object is depicted in said imagery.

19. The method of claim 16 that includes:

performing a first domain transformation on the first 2D array, yielding a first set of spatial frequency domain data;

performing a second domain transformation on the second 2D array, yielding a second set of spatial frequency domain data; and summing said first and second sets of spatial frequency domain data, to yield said output array.

20. The method of claim 16 that includes:

packing the first and second 2D arrays into a larger array;

performing a domain transformation on the larger array, yielding a set of spatial frequency domain data;

segmenting the spatial frequency domain data into plural parts, along straight boundaries defined by spatial frequency coordinates; and summing said plural parts to yield said output array.

* * * * *